United States Patent
Vail et al.

(10) Patent No.: US 7,740,973 B2
(45) Date of Patent: Jun. 22, 2010

(54) MODULAR ELECTROCHEMICAL POWER SYSTEM

(75) Inventors: Timothy E. Vail, Greenwich, CT (US); Daniel B. O'Connell, Victor, NY (US); George Hernandez, Missouri City, TX (US); David Eichinger, Old Greenwich, CT (US)

(73) Assignee: General Motors Corporation, Detroit, MI (US)

( * ) Notice: Subject to any disclaimer, the term of this patent is extended or adjusted under 35 U.S.C. 154(b) by 1050 days.

(21) Appl. No.: 10/913,153

(22) Filed: Aug. 5, 2004

(65) Prior Publication Data
US 2006/0029856 A1 Feb. 9, 2006

(51) Int. Cl.
*H01M 2/10* (2006.01)
*H01M 8/22* (2006.01)

(52) U.S. Cl. ............................................. 429/39; 429/38
(58) Field of Classification Search ...................... 429/32
See application file for complete search history.

(56) References Cited

U.S. PATENT DOCUMENTS

| | | | | |
|---|---|---|---|---|
| 4,326,013 | A * | 4/1982 | Jacobi et al. | 429/20 |
| 5,415,949 | A * | 5/1995 | Stone et al. | 429/63 |
| 5,723,229 | A * | 3/1998 | Scheifers et al. | 429/19 |
| 6,030,718 | A * | 2/2000 | Fuglevand et al. | 429/26 |
| 6,107,691 | A * | 8/2000 | Gore et al. | 290/1 R |
| 2002/0018922 | A1* | 2/2002 | Fuglevand et al. | 429/22 |
| 2002/0094476 | A1* | 7/2002 | Mattejat et al. | 429/160 |
| 2003/0091884 | A1* | 5/2003 | Scartozzi | 429/32 |
| 2004/0224201 | A1* | 11/2004 | St-Pierre et al. | 429/26 |

OTHER PUBLICATIONS

Acadmic Press Dictionary of Science and Technology, 1992, [online], [retrieved on Apr. 9, 2008], Retrieved from Credo Reference (Xreferplus) using Internet <URL: htp://www.credoreference.com/entry/3170044>.*

* cited by examiner

*Primary Examiner*—Dah-Wei D Yuan
*Assistant Examiner*—Katherine Turner
(74) *Attorney, Agent, or Firm*—Dinsmore & Shohl LLP

(57) ABSTRACT

Electrochemical power systems of modular design are provided. In accordance with one embodiment of the present invention, an electrochemical power system is provided comprising a container, at least one container reactant port, at least one container electrical power output port, module mounting hardware within the container, and a set of fuel cell modules within the container. Each of the fuel cell modules is mounted within the container via the module mounting hardware. Each of the fuel cell modules comprises at least one modular reactant port and at least one modular electrical power output port. The fuel cell modules and the module mounting hardware are configured to (i) place the modular reactant ports in communication with the container reactant port, (ii) place the modular electrical power output port in communication with the container electrical power output port, and (iii) permit replacement of a single fuel cell module substantially free of interference with remaining modules of the set of fuel cell modules.

27 Claims, 2 Drawing Sheets

MODULAR ELECTROCHEMICAL POWER SYSTEM

CROSS-REFERENCE TO RELATED APPLICATIONS

The present application is related to U.S. Patent Application Serial Nos.:

Ser. No. 10/360,998 filed Feb. 7, 2003 (now U.S. Pat. No. 7,081,193);

60/572,031, filed May 18, 2004;

Ser. No. 10/762,656, filed Jan. 22, 2004 (now U.S. Pat. No. 7,442,456); and

Ser. No. 10/762,651, filed Jan. 22, 2004 (now U.S. Pat. No. 7,485,382), the disclosures of which are incorporated herein by reference.

BACKGROUND OF THE INVENTION

The present invention relates to the electrochemical generation of power and, more specifically, to improved electrochemical power systems.

SUMMARY OF THE INVENTION

According to the present invention, electrochemical power systems of modular design are provided. In accordance with one embodiment of the present invention, an electrochemical power system is provided comprising a container, at least one container reactant port, at least one container electrical power output port, module mounting hardware within the container, and a set of fuel cell modules within the container. Each of the fuel cell modules is mounted within the container via the module mounting hardware. Each of the fuel cell modules comprises at least one modular reactant port and at least one modular electrical power output port. The fuel cell modules and the module mounting hardware are configured to (i) place the modular reactant ports in communication with the container reactant port, (ii) place the modular electrical power output port in communication with the container electrical power output port, and (iii) permit replacement of a single fuel cell module substantially free of interference with remaining modules of the set of fuel cell modules.

In accordance with another embodiment of the present invention, an electrochemical power system is provided where the container comprises at least one electrical power bus in communication with the container electrical power output port. The module mounting hardware is configured to place the modular power output ports in communication with the container electrical power output port via the electrical power bus. The electrical power bus is configured such that individual ones of the fuel cell modules may be selectively removed from the system without interrupting transfer of power from remaining ones of the fuel cell modules to the electrical power bus.

In accordance with yet another embodiment of the present invention, the fuel cell modules and the module mounting hardware are configured to: (i) place the modular reactant ports in communication with the container reactant port, (ii) place the modular electrical power output port in communication with the container electrical power output port, (iii) place the modular coolant ports in communication with the container coolant port, (iv) place the modular electrical power input ports in communication with the container electrical power input port, (v) place the modular data output ports in communication with the electrical data bus, (vi) place the modular exhaust output ports in communication with the container exhaust output port, and (vii) permit replacement of a single fuel cell module substantially free of interference with remaining modules of the set of fuel cell modules.

Accordingly, it is an object of the present invention to provide for an improved electrochemical system for generating power. Other objects of the present invention will be apparent in light of the description of the invention embodied herein.

BRIEF DESCRIPTION OF THE DRAWINGS

The following detailed description of specific embodiments of the present invention can be best understood when read in conjunction with the following drawings, where like structure is indicated with like reference numerals and in which.

DESCRIPTION OF THE PREFERRED EMBODIMENT

Figure 1:
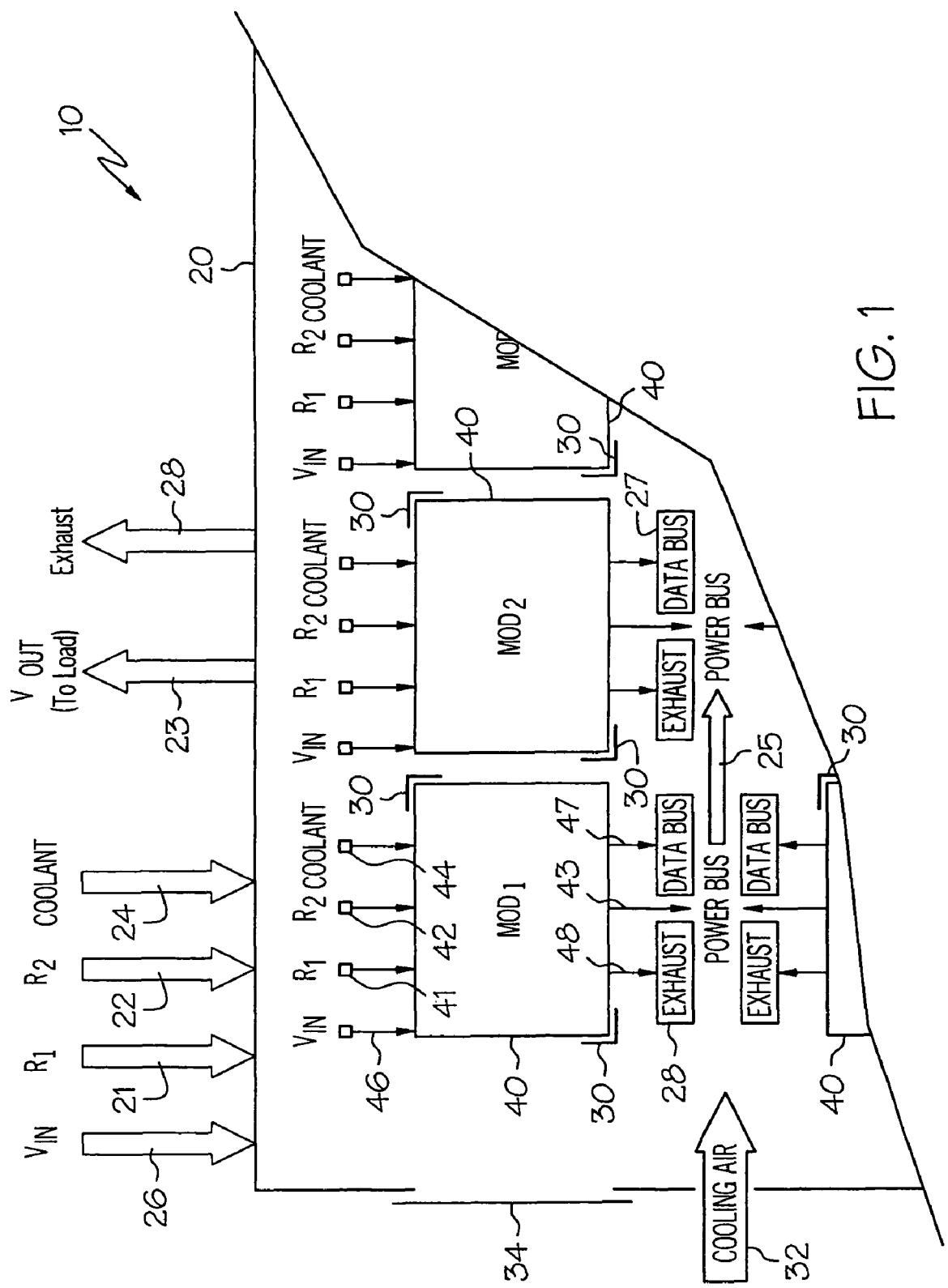
FIG. 1 is an illustration of an electrochemical power system according to the present invention.
Figure 2:
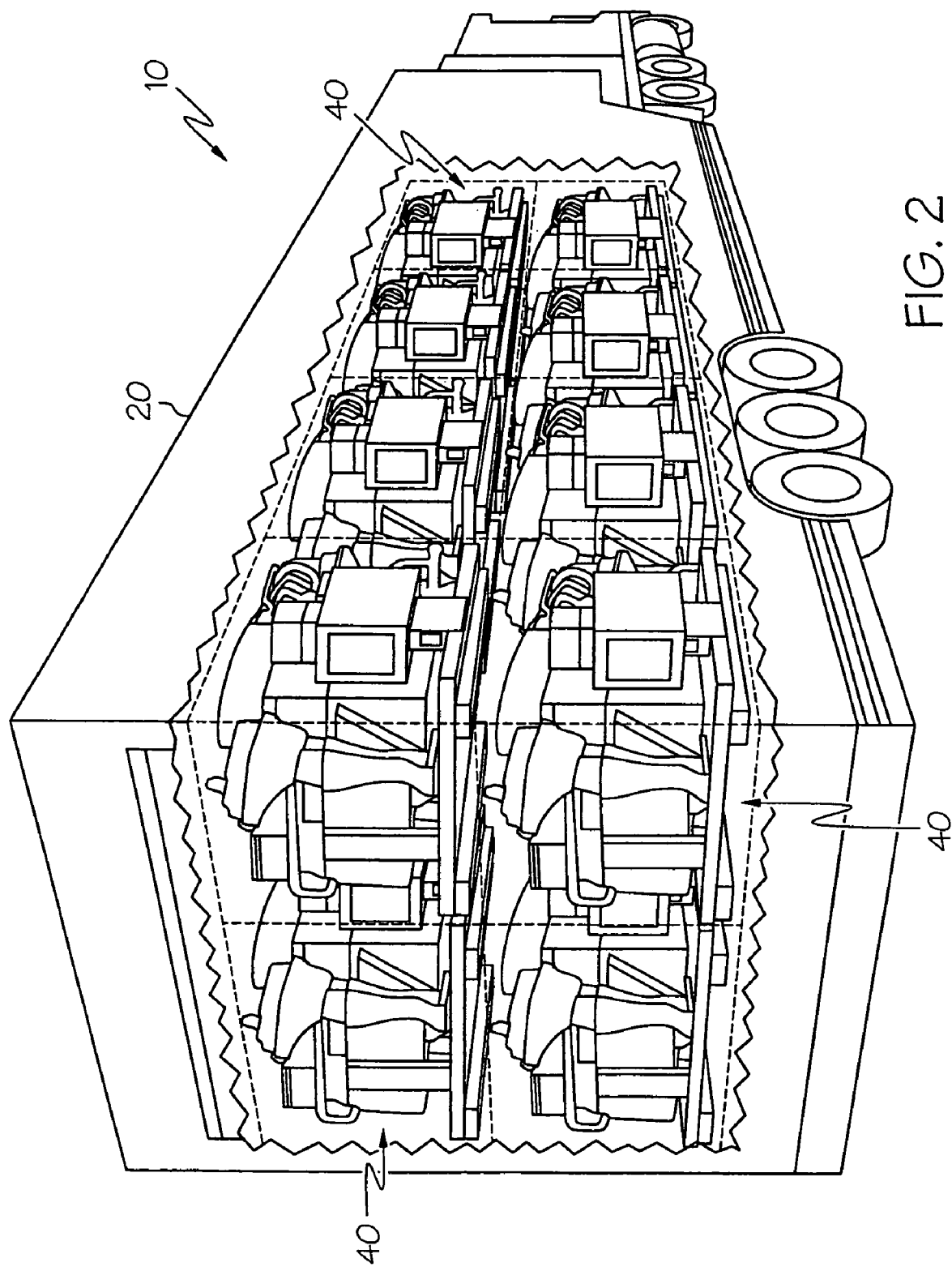
FIG. 2 is an illustration of a mobile electrochemical power system according to the present invention.

Referring to FIGS. 1 and 2, an electrochemical power system 10 according to the present invention is illustrated. Only a portion of the system 10, including a container 20, mounting hardware 30, and fuel cell modules 40, is illustrated in FIG. 1 to permit a more detailed representation of particular components of the system. The repetitive nature of the various components of the system 10 may be appreciated from the following description of the system 10 and from FIG. 2, which presents an illustration of a complete system 10 at a different level of detail than FIG. 1. FIG. 2 is also presented to illustrate that the container 20 may comprise a mobile container in the form of a wheeled trailer or motorized vehicle.

The system 10 comprises a container 20 and container reactant ports 21, 22 on an exterior surface of the container 20. The reactant ports 21, 22 enable the supply of first and second reactants $R_1$, $R_2$ to the system 10. It is contemplated that although only a pair of container reactant ports 21, 22 are illustrated in FIG. 1, any number of ports 21, 22 may be provided and associated with particular sets of fuel cell modules. A container electrical power output port 23 is also supplied for carrying the system electrical power output $V_{OUT}$. It is contemplated that although only a single container electrical power output port 23 is illustrated in FIG. 1, any number of ports 23 may be provided, depending upon the needs associated with the particular application of the system 10.

Module mounting hardware 30 is positioned within the container 20 for mounting a set of fuel cell modules 40 within the container 20. Each of the fuel cell modules 40 includes modular reactant ports 41, 42, a modular electrical power output port 43, a modular coolant port 44, a modular electrical power input port 46, a data output port 47, and a modular exhaust output port 48. Each module 40 is mounted within the container 20 via the module mounting hardware 30. To preserve clarity, only a portion of the container 20 is illustrated in FIG. 1. The remainder of the container 20 would include additional modules 40 and module mounting hardware 30 of similar structure.

According to one aspect of the present invention, the system 10 is scalable in that the number and nature of the modules 40 provided within the container 20 may vary depending upon system needs. For example, the number of modules 40 and the electrical power output characteristics of each module 40 could be scaled to meet the requirements of the container electrical power output port 23. As is described below, individual ones of the fuel cell modules 40 may be selectively replaced within the system 10 without interrupting transfer of electrical power from remaining ones of the fuel cell modules 40 to the output port 23. In this manner, the present invention provides active scalability in the face of changing electrical power output requirements.

It is contemplated that the system 10 of the present invention may be considered infinitely scalable, as there are no pre-defined limits on the number of modules 40 that may be accommodated by the container 20 or on the electrical power output characteristics of each module 40. It is also contemplated that the scalability may be achieved even if the system 10 is not configured to ensure the aforementioned continuous transfer of power from the modules 40 to the output port 23. Suitable control schemes for ensuring proper transfer of power from the modules 40 to the output port or ports 23, is described in detail in the above-noted co-pending application—U.S. patent application Ser. No. 10/762,656.

As is illustrated schematically in FIG. 1, the container 20 comprises at least one electrical power bus 25 and the module mounting hardware 30 is configured to place the modular power output ports 43 in communication with the container electrical power output port 23 via the electrical power bus 25. In the context of the present invention, an electrical bus denotes any conductive structure capable of carrying combined or uncombined electrical signals from a plurality of sources. The connection with the bus 25 may be direct or may be enabled with intervening electrical connectors.

The fuel cell modules 40 and the module mounting hardware 30 are configured such that each module 40 may be fit into a position and orientation within the container 20 that permits replacement of a single fuel cell module 40 substantially free of interference with remaining modules 40 of the set of fuel cell modules. The module mounting hardware 30 may comprise any suitable mechanism that enables convenient removal and replacement of individual fuel cell modules 40 of the container 20. For example, the module mounting hardware may comprise compression or quick-connect fittings configured to permit manual replacement of single fuel cell modules. It is contemplated that manual replacement of a module may involve the use of one or more replacement tools.

Containers according to the present invention typically comprise at least two independent container reactant ports 21, 22—one for each reactant $R_1$, $R_2$ to be supplied to the electrochemical cell of the fuel cell module 40. Similarly, each of the fuel cell modules 40 comprises first and second modular reactant ports 41, 42. The fuel cell modules 40 and the module mounting hardware 30 are configured to place the modular reactant ports 41, 42 in communication with corresponding container reactant ports 21, 22. For example, the fuel cell modules 40 and the module mounting hardware 30 may be configured such that each module may be fit into a well-defined position and orientation within the container—the resulting position and orientation being one that enables convenient connection of the modular reactant ports 41, 42 to corresponding container reactant ports 21, 22. It is contemplated that the connection may be direct, i.e., direction connection of the modular reactant ports 41, 42 to corresponding container reactant ports 21, 22, or indirect, i.e., connection via a reactant passageway of some kind.

The fuel cell modules 40 and the module mounting hardware 30 may also be configured such that the modular electrical power output port 43 is placed in communication with the container electrical power output port 23. For example, the fuel cell modules 40 and the module mounting hardware 30 may be configured such that the resulting position and orientation of the module enables convenient connection of the modular electrical power output port 43 to the container electrical power output port 23. It is contemplated that the connection may be direct or may be enabled with intervening electrical connectors.

Where a fluid coolant is used to regulate the temperature of the fuel cell modules 40, the container 20 comprises at least one container coolant port 24 for supplying coolant to the modules 40. Similarly, each of the fuel cell modules 40 comprises at least one modular coolant port 44 for circulating the coolant through each module 40. It is contemplated than one or more modular coolant ports 44 may be used for each module. Similarly, a variety of coolant passage designs may be employed. The module mounting hardware 30 is configured to place the modular coolant ports 44 in direct or indirect communication with the container coolant ports 24.

The fluid connections used for the modular coolant ports 44, the container coolant ports 24, and the associated coolant conveying hardware is preferably configured to permit convenient connection and disconnection without drainage or venting. The connections may be quick-connect fittings configured to minimize leakage at disconnect and to eliminate the need for bleeding at reconnect. The connections, passages, and conveying hardware enabling supply of the reactants $R_1$, $R_2$ to the system 10 may be configured in a similar manner to address similar concerns.

Where a relatively low power electrical source VIN is used to start-up, operate, maintain, or monitor operation of fuel cell modules 40, the container 20 comprises at least one container electrical power input port 26. Similarly, each of the fuel cell modules 40 comprises at least one modular electrical power input port 46. The module mounting hardware 30 is configured to place the modular electrical power input ports 46 in direct or indirect communication with the container electrical power input ports 26. It is contemplated that the container electrical power input port 46 may merely comprise an electrical battery stored within or outside of the container 20.

Where operating data for fuel cell modules 40 is to be used for system control or diagnostics, the container 20 comprises at least one electrical data bus 27 and each of the fuel cell modules 40 comprises at least one data output port 47. The module mounting hardware 30 is configured to place the modular data output ports 47 in direct or indirect communication with the electrical data bus 27.

Where design preferences require the controlled exhaust of reactant products, the container 20 may comprise at least one container exhaust output port 28. Similarly, each of the fuel cell modules 40 comprises at least one modular exhaust output port 48. The module mounting hardware 30 is configured to place the modular exhaust output ports 48 in direct or indirect communication with the container exhaust output port 28.

The electrical power bus 25, the container and modular reactant ports 21, 22, 41, 42, the container and modular electrical power output ports 23, 43, the container and modular coolant ports 24, 44, the container and modular electrical power input ports 26, 46, the container electrical data bus 27, and the container and modular exhaust output ports 28, 48 may each be configured such that individual ones of the fuel cell modules 40 may be selectively removed from the system 10 without interrupting transfer of electrical power, reactants, coolant, data or exhaust to or from remaining ones of the fuel cell modules 40. In this manner, modules may be removed, repaired, replaced, serviced, or upgraded without interrupting operation of the system 10.

Referring further to the design of the container 20, where appropriate temperature regulation requires or permits use of circulated air to cool modules 40 within the container 20, the container may comprise an exterior cooling air inlet 32 and a similarly structured exterior cooling air outlet (not shown). It is contemplated that any suitable air inlet/outlet design, including a plurality of air inlets and outlets, could be used with the present invention. Similarly, where installation, replacement or maintenance of fuel cell modules 40 requires or permits use of one or more access panels for the fuel cell modules 40, the container may comprise external access doors 34 of any suitable design.

The present invention is not directed to the specific mechanisms by which each fuel cell module 40 converts chemical reactants to electrical power. Accordingly, in describing the present invention, it is sufficient to note that a fuel cell module 40 may include, among other things, an electrochemical conversion assembly, first and second reactant inputs in communication with the electrochemical conversion assembly, at least one reactant product exhaust, and an electrical power output. The fuel cell module may further include hardware for enabling liquid cooling of the module, e.g., coolant passages. Relatively low power electrical components for enabling start-up and maintenance of the module may be provided as well.

By way of illustration and not limitation, the first reactant $R_1$ may comprise a humidified hydrogenous fuel mixture and the reactant may be directed to respective anode sides of the electrochemical cells of the fuel cell modules. The second reactant $R_2$ may comprise a humidified oxidant mixture and the reactant may be carried to respective cathode sides of the electrochemical cells of the fuel cell modules.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

The invention claimed is:

1. A mobile electrochemical power system configured to provide portable electrical power output to a remote load, said mobile electrochemical power system comprising:
    a wheeled container;
    at least one container reactant port on an exterior surface of said container;
    at least one container liquid coolant port;
    at least one container electrical power output port;
    at least one electrical power bus in communication with said container electrical power output port;
    a system control with at least one electrical data bus signally coupled thereto;
    module mounting hardware positioned within said container; and
    a set of fuel cell modules within said container, wherein
        each of said fuel cell modules is mounted within said container via said module mounting hardware,
        each of said fuel cell modules comprises at least one modular liquid coolant port such that said module mounting hardware is configured to place each of said at least one modular liquid coolant ports in fluid communication with a respective one of said at least one container liquid coolant ports such that a liquid coolant can be selectively introduced to each of said fuel cell modules through said respective container liquid coolant port and said at least one modular liquid coolant port, said at least one modular liquid coolant port and said respective container liquid coolant port fluidly connected to one another through at least one quick-connect fitting such that upon disconnection of said at least one modular liquid coolant port from said respective container liquid coolant port, said at least one quick-connect operates to minimize leakage at the location of said disconnection without a need for venting or draining either of said ports;
        each of said fuel cell modules comprises at least one modular reactant port, at least one data output port in signal communication with said at least one electrical data bus and at least one modular electrical power output port, and
        said fuel cell modules and said module mounting hardware are configured to place said modular reactant ports in communication with said container reactant port, place said modular electrical power output port in communication with said container electrical power output port, place at least one of a control and a diagnostic signal in signal communication between a respective one of said fuel cell modules and said system control through said at least one data output port and said at least one electrical data bus and permit replacement of a single fuel cell module substantially free of interference with remaining modules of said set of fuel cell modules such that power generated by said set of fuel cell modules can be delivered from said wheeled container to provide electrical current for the load.

2. The mobile electrochemical power system as claimed in claim 1 wherein:
    said module mounting hardware is configured to place said modular power output ports in communication with said container electrical power output port via said electrical power bus.

3. The mobile electrochemical power system as claimed in claim 1 wherein:
said electrical power bus is configured such that individual ones of said fuel cell modules may be selectively removed from said system without interrupting transfer of power from remaining ones of said fuel cell modules to said electrical power bus.

4. The mobile electrochemical power system as claimed in claim 1 wherein:
said container comprises at least two independent container reactant ports;
    each of said fuel cell modules comprises at least two independent modular reactant ports; and said module mounting hardware is configured to place said independent modular reactant ports in communication with different ones of said independent container reactant ports.

5. The mobile electrochemical power system as claimed in claim 4 wherein said independent container reactant ports and said independent modular reactant ports are configured such that individual ones of said fuel cell modules may be selectively removed from said system without interrupting transfer of reactants to remaining ones of said fuel cell modules.

6. The mobile electrochemical power system as claimed in claim 1 wherein said container liquid coolant ports and said modular liquid coolant ports are configured such that individual ones of said fuel cell modules may be selectively removed from said system without interrupting transfer of coolant to remaining ones of said fuel cell modules.

7. The mobile electrochemical power system as claimed in claim 1 wherein:
said container comprises at least one container electrical power input port;
each of said fuel cell modules comprises at least one modular electrical power input port; and
said module mounting hardware is configured to place said modular electrical power input ports in communication with said container electrical power input port.

8. The mobile electrochemical power system as claimed in claim 7 wherein said container electrical power input ports and said modular electrical power input ports are configured such that individual ones of said fuel cell modules may be selectively removed from said system without interrupting transfer of input electrical power to remaining ones of said fuel cell modules.

9. The mobile electrochemical power system as claimed in claim 7 wherein said container electrical power input port comprises an electrical battery stored within said wheeled container.

10. The mobile electrochemical power system as claimed in claim 1 wherein said container electrical data bus and said modular data output ports are configured such that individual ones of said fuel cell modules may be selectively removed from said system without interrupting transfer data from remaining ones of said fuel cell modules.

11. The mobile electrochemical power system as claimed in claim 1 wherein:
said wheeled container comprises at least one container exhaust output port;
each of said fuel cell modules comprises at least one modular exhaust output port; and
said module mounting hardware is configured to place said modular exhaust output ports in communication with said container exhaust output port.

12. The mobile electrochemical power system as claimed in claim 11 wherein said container exhaust output ports and said modular exhaust output ports are configured such that individual ones of said fuel cell modules may be selectively removed from said system without interrupting transfer exhaust from remaining ones of said fuel cell modules.

13. The mobile electrochemical power system as claimed in claim 1 wherein said module mounting hardware comprises compression fittings configured to permit manual replacement of single fuel cell modules.

14. The mobile electrochemical power system as claimed in claim 1 wherein said wheeled container comprises an exterior cooling air inlet and an exterior cooling air outlet.

15. The mobile electrochemical power system as claimed in claim 14 wherein said wheeled container and said modules are configured to define a cooling air passageway extending from said cooling air inlet to said cooling air outlet.

16. The mobile electrochemical power system as claimed in claim 1 wherein said wheeled container comprises external access doors.

17. The mobile electrochemical power system as claimed in claim 16 wherein said external access doors are positioned to permit access to said set of fuel cell modules.

18. The mobile electrochemical power system as claimed in claim 16 wherein said external access doors are positioned to permit replacement of said set of fuel cell modules via said doors.

19. The mobile electrochemical power system as claimed in claim 1 wherein said wheeled container comprises a wheeled trailer that can be connected to and subsequently transported by a motorized vehicle.

20. The mobile electrochemical power system as claimed in claim 1 wherein said wheeled container comprises a motorized vehicle.

21. The mobile electrochemical power system as claimed in claim 1 wherein said system comprises:
a plurality of container reactant ports configured to input at least one reactant externally of said wheeled container; and
a plurality of sets of fuel cell modules secured within said wheeled container, wherein respective sets of said fuel cell modules include modular reactant ports in communication with selected container reactant ports.

22. The mobile electrochemical power system as claimed in claim 1 wherein said system comprises:
a plurality of container electrical power output ports; and
a plurality of sets of fuel cell modules secured within said wheeled container, wherein respective sets of said fuel cell modules include modular electrical power output ports in communication with a selected container power output ports.

23. The mobile electrochemical power system as claimed in claim 1 wherein said electrochemical power system is configured such that the number of modules within said set of fuel cell modules is scalable.

24. The mobile electrochemical power system as claimed in claim 1 wherein said electrochemical power system is configured such that the electrical power output characteristics of each module are independently scalable.

25. The mobile electrochemical power system as claimed in claim 1 wherein said electrochemical power system is configured such that the number of modules within said set of fuel cell modules and the electrical power output characteristics of each module are scalable.

26. A mobile electrochemical power system comprising:
a wheeled container;
at least two independent container reactant ports on an exterior surface of said wheeled container;
at least one container liquid coolant port;
at least one container electrical power output port;
at least one electrical power bus in communication with said container electrical power output port;
a system control with at least one electrical data bus signally coupled thereto;
module mounting hardware positioned within said wheeled container; and
a set of fuel cell modules within said wheeled container, wherein
said wheeled container comprises at least one electrical power bus in communication with said container electrical power output port, said at least one electrical power bus is configured such that individual ones of said fuel cell modules may be selectively removed from said system without interrupting transfer of power from remaining ones of said fuel cell modules to said electrical power bus, each of said fuel cell modules is mounted within said wheeled container via said module mounting hardware, each of said fuel cell modules comprises a modular liquid coolant port such that said module mounting hardware is configured to place said modular liquid coolant port in fluid communication with said container liquid coolant port such that a liquid coolant can be selectively introduced to each of said fuel cell modules through said container liquid coolant port and said modular liquid coolant port, said modular liquid coolant port and said container liquid coolant port fluidly connected to one another through at least one quick-connect fitting such that upon disconnection of said modular liquid coolant port from said container liquid coolant port, said at least one quick-connect operates to minimize leakage at the location of said disconnection without a need for venting or draining either of said ports;

each of said fuel cell modules comprises at least two modular independent reactant ports, at least one data output port in signal communication with said at least one electrical data bus and at least one modular electrical power output port, and said fuel cell modules and said module mounting hardware are configured to place said independent modular reactant ports in communication with different ones of said independent container reactant ports, place said modular electrical power output port in communication with said container electrical power output port, place said modular power output ports in communication with said electrical power bus, place at least one of a control and a diagnostic signal in signal communication between a respective one of said fuel cell modules and said system control through said at least one data output port and said at least one electrical data bus and permit replacement of a single fuel cell module substantially free of interference with remaining modules of said set of fuel cell modules.

27. A mobile electrochemical power system comprising:

a wheeled container comprising at least one electrical power bus, a system control with at least one electrical data bus, and at least one container exhaust output port;

at least one container reactant port on an exterior surface of said wheeled container;

at least one container liquid coolant port;

at least one container electrical power output port coupled to said electrical power bus;

module mounting hardware positioned within said wheeled container; and a set of fuel cell modules within said wheeled container, wherein each of said fuel cell modules is mounted within said wheeled container via said module mounting hardware, each of said fuel cell modules comprises at least one modular liquid coolant port such that said module mounting hardware is configured to place said modular liquid coolant ports in fluid communication with said container liquid coolant port such that a liquid coolant can be selectively introduced to each of said fuel cell modules through said container liquid coolant port and said at least one modular liquid coolant port, said at least one modular liquid coolant port and said container liquid coolant port fluidly connected to one another through at least one quick-connect fitting such that upon disconnection of said at least one modular liquid coolant port from said container liquid coolant port, said at least one quick-connect operates to minimize leakage at the location of said disconnection without a need for venting or draining either of said ports;

each of said fuel cell modules comprises at least one modular reactant port, at least one modular electrical power output port, at least one modular coolant port, at least one modular electrical power input port, at least one data output port, at least one modular exhaust output port, and said fuel cell modules and said module mounting hardware are configured to place said modular reactant ports in communication with said container reactant port, place said modular electrical power output port in communication with said container electrical power output port, place said modular coolant ports in communication with said container coolant port, place said modular electrical power input ports in communication with said container electrical power input port, place said modular data output ports in communication with said electrical data bus, place said modular exhaust output ports in communication with said container exhaust output port, and permit replacement of a single fuel cell module substantially free of interference with remaining modules of said set of fuel cell modules.

* * * * *